United States Patent Office 2,966,397
Patented Dec. 27, 1960

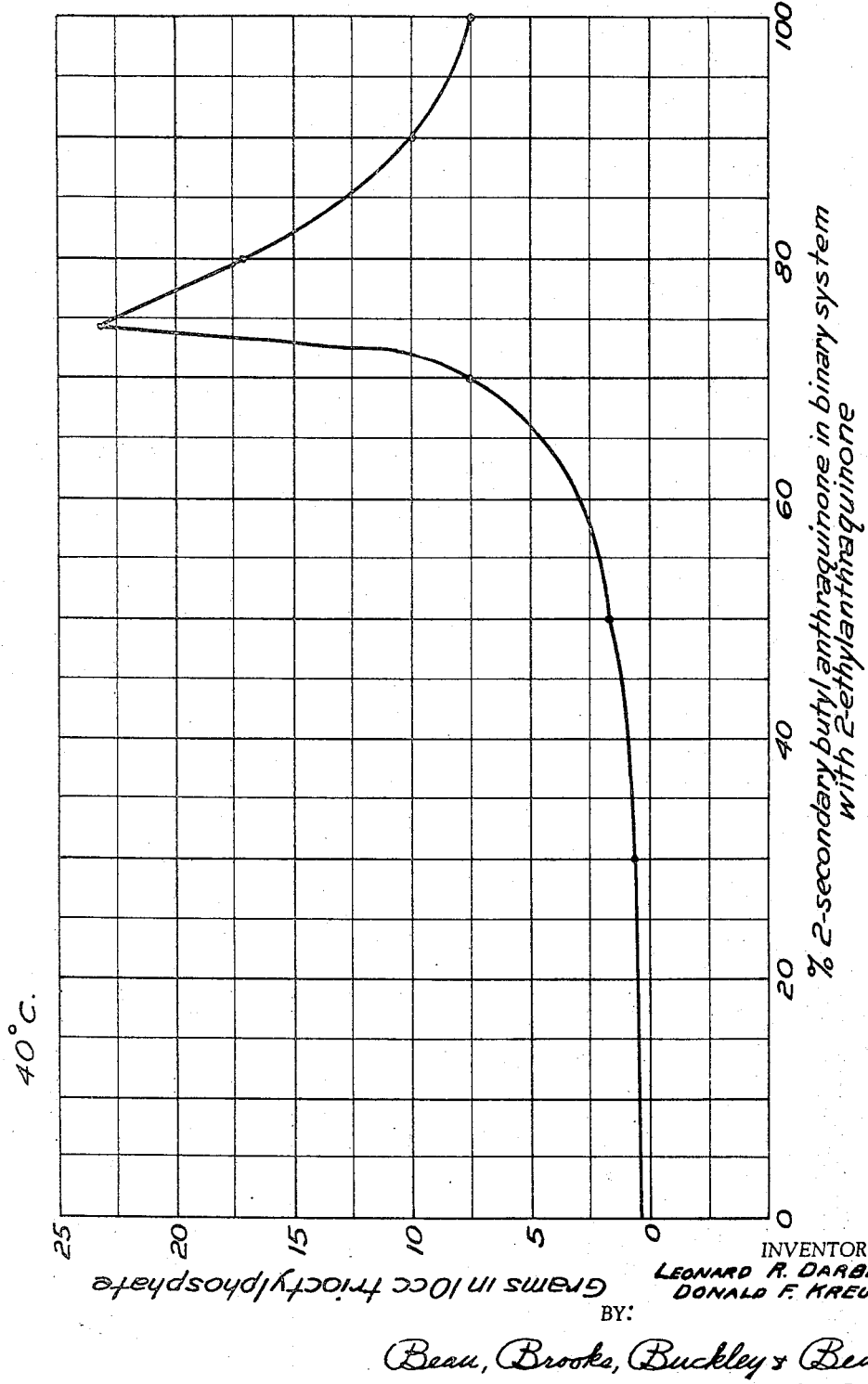

2,966,397

PRODUCTION OF HYDROGEN PEROXIDE

Leonard R. Darbee, Grand Island, and Donald F. Kreuz, Buffalo, N.Y., assignors to Food Machinery and Chemical Corporation, San Jose, Calif.

Filed Oct. 24, 1956, Ser. No. 618,069

9 Claims. (Cl. 23—207)

This invention relates to the manufacture of hydrogen peroxide by the cyclic reduction and oxidation of a class of materials which may be anthraquinones, alkylated anthraquinones or the tetrahydro derivatives thereof.

Heretofore it has been proposed to manufacture hydrogen peroxide by cyclic reduction and oxidation in accordance with the so-called anthraquinone process by attempting to increase the amount of working material present in the equipment and in solution by providing a mixed solvent, one constituent of which possessed exceptional solvent power for the hydroquinone form of the working material, and another constituent of which possessed exceptional solvent power for the quinone form of the working material. This type of operation is exemplified by the disclosure contained in U.S. Patents 2,158,525 and 2,215,883; the commercial operation being set forth in PB Report 4336.

From the theoretical point of view, one mole of hydrogen peroxide can be produced from one mole of alkylated anthraquinone providing the alkylated anthraquinone—the working material—is completely hydrogenated. In normal practice, the hydrogenation is not carried to 100% by reason of certain undesirable side reactions which may occur, but is normally carried to only about 50%. See PB Report 4336.

Additional suggestions for increasing the amount of hydrogen peroxide obtainable from an alkylated anthraquinone rests upon an increase in the solubility of the working compound in a given amount of working solution and to this end it has been suggested to employ one of the allegedly more soluble alkylated anthraquinones, namely tertiary butyl anthraquinone, all as set forth in U.S. Patent 2,689,169.

From the above it will be seen that it is highly desirable to increase the amount of working material present in a given volume of working solution or passing through a particular equipment in which this cyclic operation is conducted in any given unit of time and, furthermore, to be able to increase the degree of hydrogenation permitted.

It is therefore an object of the present invention to devise suitable compositions of alkylated anthraquinones which are more soluble in a given unit of working solution than has heretofore been possible.

As an ancillary object of the invention, there is provided a procedure whereby it may be possible to reduce the amount of solvent or working solution required to carry a given amount of alkylated anthraquinones and thereby increase the output of a given piece of equipment.

These objects and the attendant advantages of the invention are obtained by employing as the working material in the cyclic hydrogenation and oxidation of alklated anthraquinones and their tetrahydro derivatives, special and limited mixtures of alkyl-anthraquinones which possess maximum solubility in the usual solvents employed in the so-called anthraquinone process. To this end, and in accordance with the principles of the present invention, specific compositions of mixtures of alkylated anthraquinones in the neighborhood of the eutectic mixtures in binary, tertiary and quaternary systems are employed as the working material since by this means it is possible to obtain in solution, in a given solvent, as much as several times the amount of working compound as may be carried in solution when a single alkylated anthraquinone is used as the working material or when random mixtures thereof are so employed.

Heretofore, in normal operation employing a mixed solvent of 40 cc. of anisole and 60 cc. isoheptyl alcohol, 15 grams of 2-ethyl anthraquinone may be carried as working material with production of approximately 1 gram of hydrogen peroxide when the working solution is hydrogenated with 800 cc. of hydrogen. In contrast to this, a eutectic mixture of 2-secondary butyl anthraquinone and 2-ethyl anthraquinone, that is, a composition of the lowest melting point of those two components consisting of 73.5% 2-secondary butyl anthraquinone and 26.5% 2-ethyl anthraquinone, dissolve in a similar solvent to well over twice the extent of the single alkyl anthraquinone, 2-ethyl anthraquinone.

In another way of observing the advantages of the invention, it may be pointed out that 2-ethyl anthraquinone at 20° C. is soluble in trioctylphosphate to the extent of 1.5 grams in 100 cc. of trioctylphosphate. The eutectic composition, 73.5% 2-secondary butyl anthraquinone, 26.5% 2-ethylanthraquinone, however, is soluble to the extent of 47 grams per hundred cc. of that solvent, an increase of over 3000%.

At 40° C. the comparison is even more striking, 2-ethyl anthraquinone at that temperature being soluble to the extent of 50 grams per 100 cc. of solvent, the eutectic mixture being soluble to the extent of 260 grams per 100 cc. of trioctylphosphate.

It will be readily apparent that the increase in solubility will make possible a reduction in the amount of mixed working solution required or a reduction in the amount of either or both the solvent for the hydroquinone form of the working material and the solvent for the quinone form of the working material required, it being apparent that with a reduction in volume of working solvent required there will be a corresponding increase in working material passing through the equipment in one cycle which is reduced and oxidized. There is, therefore, an increase in the amount of hydrogen peroxide theoretically capable of production in one pass of the working solution, i.e., working solvent and dissolved working material in one cycle.

The drawing is a graph of the solubility of the system 2-ethyl anthraquinone and 2-secondary butyl anthraquinone in trioctylphosphate at 40° C., the ordinates being expressed in the number of grams of material soluble in 10 cc. of trioctylphosphate at the indicated temperature, while the abscissa represents compositions in the binary system 2-ethyl anthraquinone and 2-secondary butyl anthraquinone of from 0 to 100% of each component.

The curve of this graph shows that whereas a random mixture of 2-ethyl anthraquinone and 2-secondary butyl anthraquinone of 80% of the former, and 20% of the latter, possess a solubility of about 0.5 gram in 10 cc. trioctylphosphate and a 50/50 mixture, a solubility of 1.75 grams, the 30:70 mixture has increased to about 7.5 grams, the increase in solubility being extremely rapid thereafter to the eutectic mixture which mixture is soluble to the extent of about 23 grams in 10 cc. trioctylphosphate, which mixture comprises 73.5% 2-secondary butyl anthraquinone and 26.5% 2-ethyl anthraquinone.

Eutectic mixtures of other binary systems are as follows:

44.5% 2-ethyl anthraquinone
55.5% 2-tertiary butyl anthraquinone
Melting point, 69° C.

31.5% 2-tertiary butyl anthraquinone
68.5% 2-secondary butyl anthraquinone
Melting point, 43° C.

26.5% 2-ethyl anthraquinone
73.5% 2-secondary butyl anthraquinone
Melting point, 42° C.

The solubility of such eutectic mixtures shows solubility curves similar to that illustrated in the drawing.

In a typical operation of the procedure, in accordance with the present invention, a liter of solvent consisting of 99% by volume trioctylphosphate and 1% by volume dimethyl naphthalene may be used to dissolve 400 grams of a mixture of 78% secondary butyl anthraquinone and 22% 2-ethyl anthraquinone, a composition approximating the eutectic mixture of a binary system of those components to produce a working solution, the volume of which is 1.34 liters. This corresponds to 300 grams of working material per liter of working solution. This solution, when hydrogenated to 50% of its capacity of hydrogen take-up to produce hydroquinone, and subsequently oxidized and then extracted with water, produces 19.2 gram hydrogen peroxide per liter of working solution.

This yield of hydrogen peroxide is in contrast to a production of 11.3 gram hydrogen peroxide per liter, as outlined in U.S. Patent No. 2,768,066, granted October 23, 1956, to Dawsey and Umhoefer, and a yield of 5.5 gram hydrogen peroxide per liter of working solution, as outlined in PB Report 4336.

In the above example it will be noted that the amount of dimethyl naphthalene, namely the solvent constituent for dissolving the quinone form of the working material, required is extremely small and, in fact, may be possible to operate in a single solvent.

The larger quantity of working material when reduced requires a solvent for the hydroquinone form thereof, and any of the well known solvents may be used, to this end, for instance phosphate esters, phosphonate esters, $C_7$ to $C_{11}$ aliphatic alcohols, alkyl cyclohexanol, sebacate esters and others. In the aspect of the anthraquinone process set forth by the present invention, the make-up and type of solvent used seems of lesser importance than heretofore.

Heretofore, increase in peroxide yield per unit of working solution has been attempted by employment of solvent mixtures which would permit a greater solution concentration of working material. In the instant invention, increase in working material per unit volume of working solution is obtained by a control over the composition of the working material itself. In effect, a certain volume of the inert constituents of the working solution is replaced by a corresponding volume of working material.

It will be seen from the above that by choosing selected mixtures of the alkyl anthraquinones, particularly those mixtures of the alkyl anthraquinones having alkyl side chains of from 1 to 4 carbon atoms, which mixtures are the lowest melting point mixtures for that particular system, one may obtain an outstanding advantage in increased solubility of working material content per liter of working solution thereby to increase materially the yield of hydrogen peroxide per liter of working solution and thus to increase the capacity of a given piece of equipment adapted to be used in the cyclic reduction and oxidation in the so-called anthraquinone process for producing hydrogen peroxide.

Although the solubility of the eutectic mixture has been illustrated and shown in Fig. 1, it will be apparent that excellent results may be obtained by using as a working material a mixture containing 2-secondary butyl anthraquinone and 2-ethyl anthraquinone wherein the former is present to the amount of 70% to 85% and the latter, 30% to 15% by weight.

As to the system 2-ethyl anthraquinone and 2-tertiary butyl anthraquinone, extremely advantageous results and yield of hydrogen peroxide, by reason of increased solubility, may be obtained with a working solution of 50 to 30% of the former and 50 to 70% of the latter by weight.

In the system 2-secondary butyl anthraquinone, 2-tertiary butyl anthraquinone, the range of materials will be 65 to 80% of the former and 35 to 20% of the latter by weight.

It will be understood by those familiar with this art that after a considerable number of cycles, there may be produced a small amount of inert material not entering into the reaction and the percentages given herein will be based upon the initial composition of the working material rather than upon a slightly changed relationship which may arise by reason of the generation of inert products.

In an operation where an inhibited catalyst is not employed, nuclear hydrogenation occurs and the amount of the tetrahydro derivatives present may be controlled by subjecting a part or all of the working material to known dehydrogenation procedures to maintain a desired relationship between the original anthraquinones and their tetrahydro derivatives. An initial binary system, in such an event, becomes a quaternary system, which system is operable to produce hydrogen peroxide.

What is claimed is:

1. In the method of producing hydrogen peroxide by the cyclic reduction and oxidation of a working material selected from the group consisting of the alkylated anthraquinones and their tetrahydro derivatives, the improvement which comprises selecting as the working material a mixture of at least 2 constituents of the group mentioned above and at a working material concentration higher than for any constituent employable alone and substantially corresponding to the eutectic mixture thereof, said eutectic mixture constituting a mixture of at least two of said constituents which has the lowest constant melting point of any mixture of these constituents.

2. In the method of producing hydrogen peroxide by the cyclic reduction and oxidation of a working material selected from the group consisting of anthraquinones and the alkylated anthraquinones and their tetrahydro derivatives, the improvement which comprises selecting as the working material a mixture of 2-ethyl anthraquinone and 2-secondary butyl anthraquinone substantially corresponding to the eutectic mixture of the binary system comprising those compounds and at a working material concentration higher than for any constituent employable alone, said eutectic mixture constituting a mixture of at least two of said constituents which has the lowest constant melting point of any mixture of these constituents.

3. In the method of producing hydrogen peroxide by the cyclic reduction and oxidation of a working material selected from the group consisting of anthraquinones and the alkylated anthraquinones and their tetrahydro derivatives, the improvement which comprises selecting as the working material a mixture of 2-tertiary butyl anthraquinone and 2-secondary butyl anthraquinone substantially corresponding to the eutectic mixture of the binary system comprising those compounds and at a working material concentration higher than for any constituent employable alone, said eutectic mixture constituting a mixture of at least two of said constituents which has the lowest constant melting point of any mixture of these constituents.

4. In the method of producing hydrogen peroxide by the cyclic reduction and oxidation of a working material selected from the group consisting of anthraquinones and the alkylated anthraquinones and their tetrahydro derivatives, the improvement which comprises selecting as the working material a mixture of 2-ethylanthraquinone and 2-tertiary butyl anthraquinone substantially corresponding to the eutectic mixture of the binary system comprising those compounds and at a working material concentration higher than for any constitutent employable alone, said eutectic mixture constituting a mixture of at least two of said constituents which has the lowest constant melting point of any mixture of these constituents.

5. In the method of producing hydrogen peroxide by the cyclic reduction and oxidation in solution of a working material selected from the group consisting of the alkylated anthraquinones and their tetrahydro derivatives, the improvement which comprises selecting as the working material a mixture of 2-secondary butyl anthraquinone and 2-ethyl anthraquinone, the former being in the range 70% to 85%, the latter 30% to 15% by weight of the working material.

6. In the method of producing hydrogen peroxide by the cyclic reduction and oxidation in solution of a working material selected from the group consisting of the alkylated anthraquinones and their tetrahydro derivatives, the improvement which comprises selecting as the working material a mixture of 2-tertiary butyl anthraquinone and 2-ethyl anthraquinone, the former being in the range 50% to 70% and the latter 50% to 30% by weight of the working material.

7. In the method of producing hydrogen peroxide by the cyclic reduction and oxidation in solution of a working material selected from the group consisting of the alkylated anthraquinones and their tetrahydro derivatives, the improvement which comprises selecting as the working material a mixture of 2-tertiary butyl anthraquinone and 2-secondary butyl anthraquinone, the former being in the range 35% to 20% and the latter 65% to 80% by weight of the working material.

8. In the method of producing hydrogen peroxide by the cyclic reduction and oxidation of a working material selected from the group consisting of the alkylated antraquinones and their tetrahydro derivatives, the improvement which comprises selecting as the working material a mixture of at least two constituents of the group mentioned above and at a working material concentration higher than for any constituent employable alone, said mixture corresponding to the eutectic mixture thereof, said eutectic mixture constituting a mixture of at least two of said constituents which has the lowest constant melting point of any mixture of these constituents.

9. In the method of producing hydrogen peroxide by the cyclic reduction and oxidation of the working material selected from the group consisting of the alkyalted anthraquinones and their tetrahydro derivatives, wherein said alkylated groups have from 1 to 4 carbon atoms, the improvement which comprises selecting as the working material a mixture of at least two constitutents of the group mentioned above and at a working material concentration higher than for any constituent employable alone and substantially corresponding to the eutectic mixture thereof, said eutectic mixture constituting a mixture of at least two of said constituents which has the lowest constant melting point of any mixture of these constituents.

References Cited in the file of this patent

UNITED STATES PATENTS

| | | |
|---|---|---|
| 2,657,980 | Sprauer | Nov. 3, 1953 |
| 2,837,411 | Jenney | June 3, 1958 |

FOREIGN PATENTS

| | | |
|---|---|---|
| 465,070 | Great Britain | Apr. 30, 1937 |